US010977163B1

(12) United States Patent
Rhodes et al.

(10) Patent No.: US 10,977,163 B1
(45) Date of Patent: Apr. 13, 2021

(54) TEST MANAGEMENT SYSTEM AND METHOD FOR AN INTEGRATED COMPUTING SYSTEM

(71) Applicant: VCE IP Holding Company LLC, Richardson, TX (US)

(72) Inventors: Stacy Rhodes, Murphy, TX (US); Orone Laizerovich, Plano, TX (US); Qing Xia, Frisco, TX (US); Russell Anderson, Rowlett, TX (US); Puja Sarda, Plano, TX (US); Harshita Rumalla, Dallas, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 1 day.

(21) Appl. No.: 15/581,251

(22) Filed: Apr. 28, 2017

(51) Int. Cl.
*G06F 11/36* (2006.01)

(52) U.S. Cl.
CPC ...... *G06F 11/3684* (2013.01); *G06F 11/3612* (2013.01); *G06F 11/3664* (2013.01); *G06F 11/3688* (2013.01)

(58) Field of Classification Search
CPC ............. G06F 11/3409; G06F 11/3692; G06F 11/3452; G06F 11/3668; G06F 8/20; G06F 2221/2113; G06F 9/5072; G06F 8/24; G06F 9/50; G06F 2221/2149; G06F 8/10; G06F 9/5011; G06F 9/5027; G06F 9/5044; G06F 9/5083; G06F 21/602; G06F 21/71;

(Continued)

(56) References Cited

U.S. PATENT DOCUMENTS

| 7,949,992 B2 * | 5/2011 | Andreev | G06F 8/10 709/223 |
| 8,225,152 B2 * | 7/2012 | Sutton | G01R 31/31912 714/724 |

(Continued)

OTHER PUBLICATIONS

Anol Bhattacherjee et al.; Understanding Changes in Belief and Attitude toward Information Technology Usage; MIS University of Minnesota; pp. 229-254; retrieved on Dec. 3, 2020. (Year: 2004).*

(Continued)

*Primary Examiner* — S. Sough
*Assistant Examiner* — Cuong V Luu
(74) *Attorney, Agent, or Firm* — Polsinelli PC

(57) ABSTRACT

A system for use as part of a test management system for an integrated computing system may obtain a first object instance of the integrated computing system in which the first object instance generated by applying configuration attributes of the integrated computing system to an object model of the integrated computing system. The first object instance includes a plurality of hierarchally arranged sub-object instances representing a plurality of hierarchally arranged resources of the integrated computing system. The instructions also generate a second object instance from the first object instance, including, for each sub-object instance included within the second object instance, identifying one or more criteria associated with the sub-object instance, generating one or more test procedures to verify proper operation of the resources associated with the sub-object instance according to the one or more criteria, and including the generated test procedures in the sub-object instance of the second object instance.

20 Claims, 13 Drawing Sheets

(58) Field of Classification Search
CPC .............. G06F 11/3684; G06F 11/3612; G06F 11/3664; G06F 11/3688; G06F 1/26; G06F 11/0706; G06F 11/0733; H04L 63/20; H04L 67/02; H04L 67/10; G06Q 10/0635; G06Q 10/10; G06Q 30/04
See application file for complete search history.

(56) References Cited

U.S. PATENT DOCUMENTS

| | | | | |
|---|---|---|---|---|
| 2003/0212938 | A1* | 11/2003 | Sutton | G01R 31/318307 714/724 |
| 2007/0300204 | A1* | 12/2007 | Andreev | G06F 8/10 717/104 |
| 2009/0309556 | A1* | 12/2009 | Franco | G01R 31/31721 323/234 |
| 2012/0317033 | A1* | 12/2012 | Heidasch | G06Q 10/06 705/51 |
| 2014/0059196 | A1 | 2/2014 | Onffroy et al. | |
| 2016/0034379 | A1* | 2/2016 | Shah | G06F 11/3664 707/602 |
| 2017/0315904 | A1* | 11/2017 | Tharippala | H04L 67/10 |

OTHER PUBLICATIONS

Peter Roberts et al.; Information technology acceptance in a sample of government employees: a test of the technology acceptance model; Elsevier; pp. 427-443; retrieved on Dec. 3, 2020 (Year: 2000).*

* cited by examiner

TEST MANAGEMENT SYSTEM AND METHOD FOR AN INTEGRATED COMPUTING SYSTEM

TECHNICAL FIELD

Aspects of the present disclosure relate to computing devices and, in particular, to a test management system and method for an integrated computing system.

BACKGROUND

Computing environments used by enterprises, such as corporations and universities, are often provided by multiple computing devices that function in a collaborative manner to meet the computing resource needs of the enterprise. Such collaborative computing arrangements are also useful in cloud computing environments where users of the cloud have differing needs for storage and compute resources, among others. Converged infrastructures, among other solutions, have been developed to provide a standardized package of resources combined into a single, optimized computing solution with a relatively high level of customizability. In general, any such computing system should be fully tested prior to deployment. Testing of such computing systems often involves development of test procedures, and then performing those test procedures on a target computing system to ensure that it meets one or more requirements specified by the customer, or other performance objectives that may be associated with the use of the integrated computing system.

SUMMARY

According to one aspect of the present disclosure, a system for use as part of a test management system for an integrated computing system includes computer executable instructions to obtain a first object instance of the integrated computing system in which the first object instance generated by applying configuration attributes of the integrated computing system to an object model of the integrated computing system. The first object instance includes a plurality of hierarchally arranged sub-object instances representing a plurality of hierarchally arranged resources of the integrated computing system. The instructions also generate a second object instance from the first object instance, including, for each sub-object instance included within the second object instance, identifying one or more criteria associated with the sub-object instance, generating one or more test procedures to verify proper operation of the resources associated with the sub-object instance according to the one or more criteria, and including the generated test procedures in the sub-object instance of the second object instance.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

DETAILED DESCRIPTION

Embodiments of the present disclosure provide an integrated computing system test management system and method that generates test procedures to be used for testing integrated computing systems. An integrated computing system may include compute, storage, and network resources. The tool obtains criteria associated with each resource configured in the integrated computing system, and processes those criteria to generate test procedures using a hierarchal, object-oriented database model. The generated test procedures may be included in a test plan that is formatted in human readable form for manual use, or may be used to control one or more test devices to automatically conduct the test procedures on the integrated computing system.

In general, all integrated computing systems should be fully tested prior to deployment or shipment to a customer. Testing of integrated computing systems often involves development of test procedures, and then performing those test procedures on a target integrated computing system to ensure that it meets one or more requirements specified by the customer. Due to the heavily customized nature of integrated computing systems, however; the performance characteristics of resources may vary widely due to how those resources are configured in each integrated computing system. Additionally, some test procedures that may provide useful information in some configurations may be entirely inapplicable in other configurations.

A test procedure generally involves a sequence of one or more actions that are performed to verify the proper operation of a resource or a group of resources. For example, one test procedure may be an action of verifying that a resource meets a certain criteria, such as a minimum amount of memory, a certain physical dimension, a number and type of communication ports, and the like. As another example, another test procedure may include an action of generating a test environment (e.g., loading a compute resource with a certain amount of memory usage), followed by another action of executing a test script, and further followed by measuring the performance of the resource due to the memory loading and test script execution to ensure certain performance criteria are adequately met.

Traditionally, test procedures have been manually developed based upon personal experience or subject matter expertise obtained through previous integrated computing system designs. Test procedure management systems have been developed, but they only provide a repository for managing the manually developed test on some target integrated computing system. This manual technique has been particularly burdensome when used to test integrated computing systems having a wide range of customizability and performance objectives such that each particular integrated computing system may vary greatly from others.

Figure 1A:
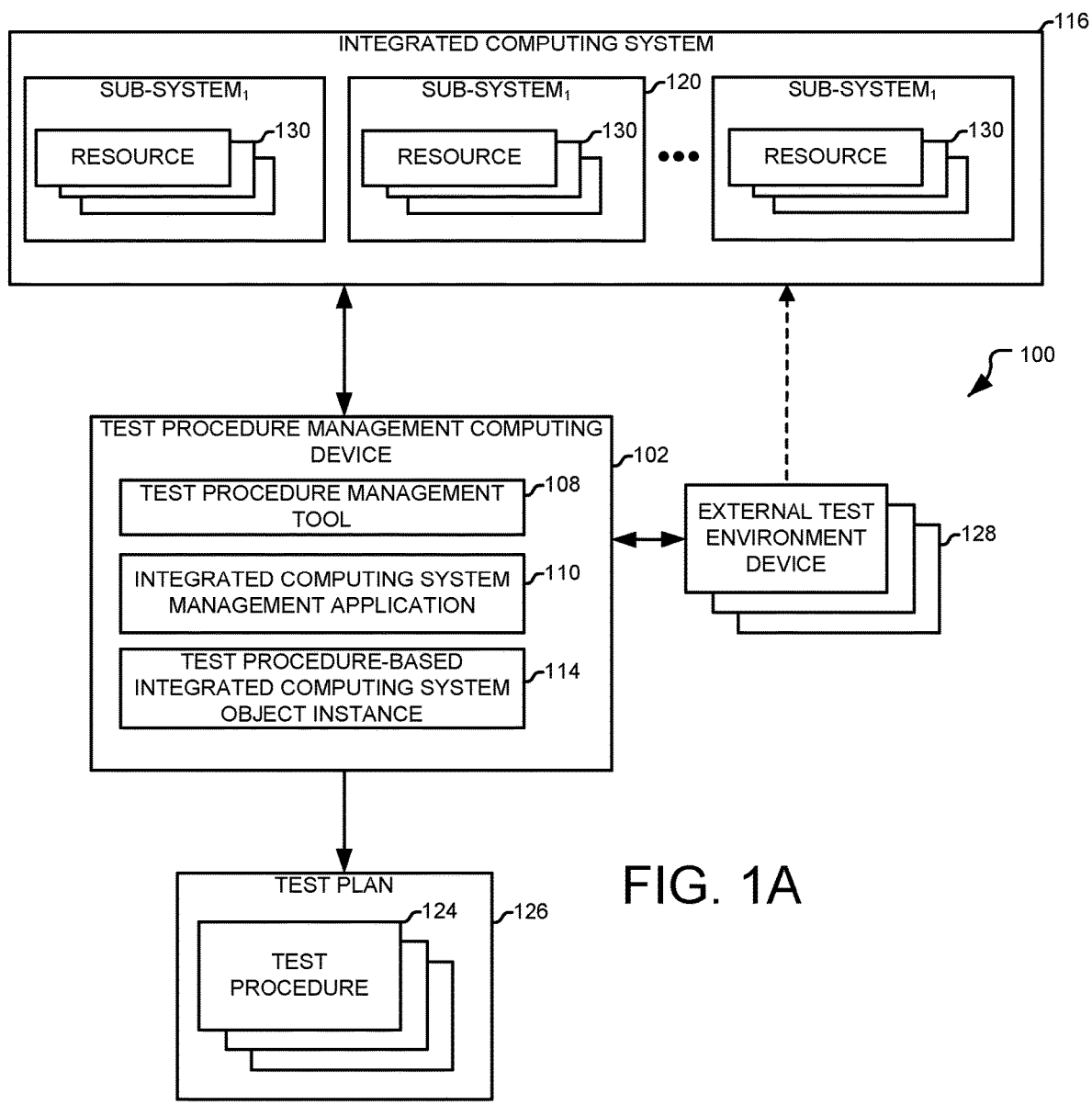
FIGS. 1A through 1C illustrate an example test procedure management system according to the teachings of the present disclosure.
Figure 1B:
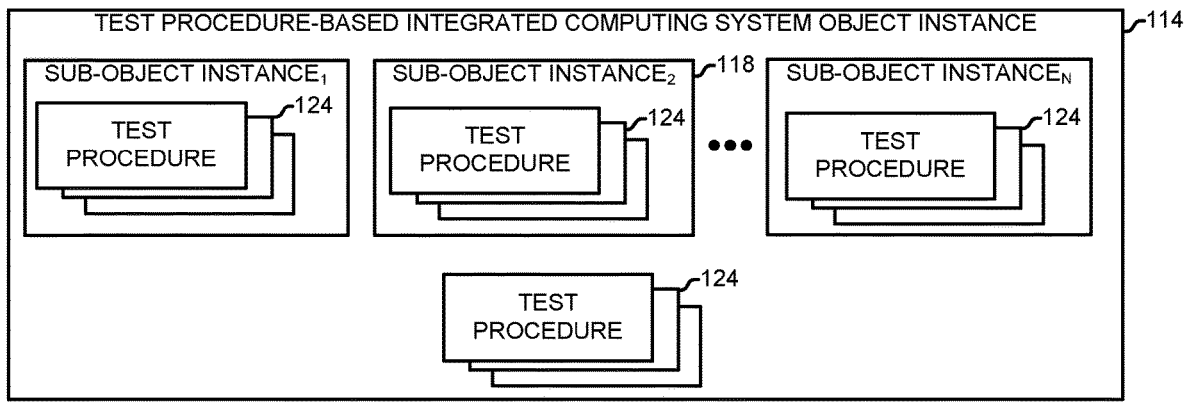
Figure 1C:
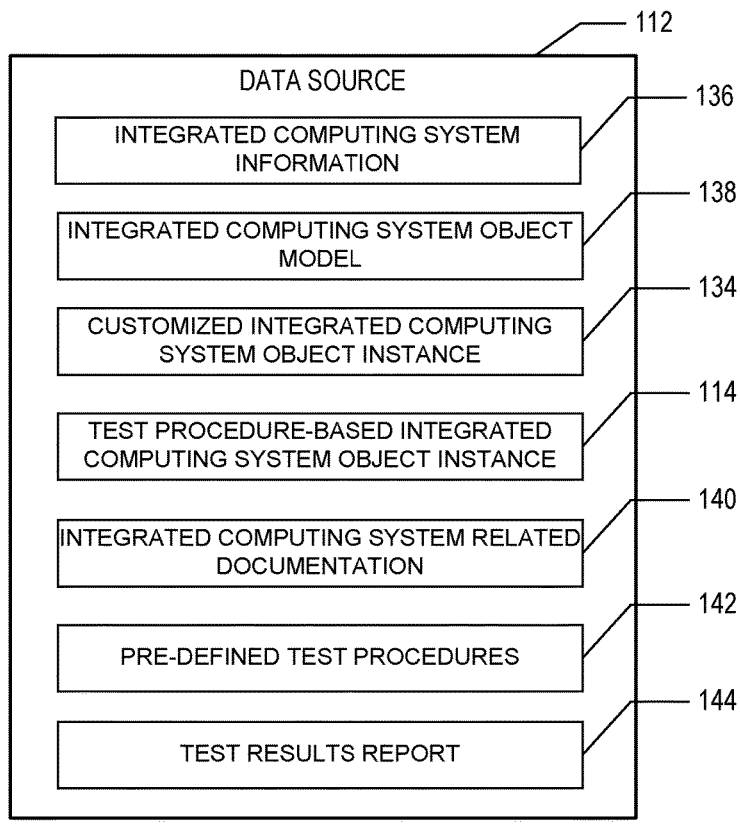

FIGS. 1A through 1C illustrate an example test procedure management system 100 according to the teachings of the present disclosure. The test procedure management system 100 addresses the problems discussed above with conventional systems among other benefits and solutions. The system 100 includes a test procedure management computing device 102 having a test procedure management tool 108, and an integrated computing system management application 110. As will be described in detail below, the test procedure management tool 108 creates a test-based integrated computing system object instance 114 generated according to an object model that represents an integrated computing system 116. The test-based integrated computing system object instance 114 includes one or more sub-object instances 118 corresponding to one or more hierarchally arranged sub-systems 120 of the integrated computing system 116.

The tool 108 modifies one or more test-based sub-object instances 118 to include test procedures 124 for the test-based integrated computing system object instance 114 and its respective sub-object instances 118. For example, the test procedures 124 may be included as functions or attributes of the sub-object instance 118. Thus, the resulting test-based integrated computing system object instance 114 may be used to create a human readable test plan 126 that can be used to manually perform the test procedures 124 and/or automatically control the operation of the integrated computing system 116 for performing each of the test procedures 124 on the integrated computing system 116 via use of the tool 108. Stated differently, the tool 108 augments certain test-based sub-object instances 118 to include functions in the form of test procedures 124 that can be used for testing of its respective resource 130.

In one embodiment, the system 100 may include one or more external test environment devices 128 that are controlled by the tool 108 to create a test environment under which certain test procedures 124 may be performed on the integrated computing system 116. For example, one external test environment device 128 may include a network communication device that generates test (e.g., dummy) communication traffic that can be fed into one or more of the communication ports of the integrated computing system 116 for testing the internal networking resources of the integrated computing system 116. Additionally, the tool 108 may be configured to adjust the rate of traffic generated by the network communication device to test various aspects of the internal networking resources of the integrated computing system 116, such as data buffering capabilities, traffic congestion, bit error rate (BER), frame error rate, quality of service (QoS), and the like. Additionally, the tool 108 may be configured to obtain parametric values measured by one or more of the external test environment devices 128 to quantitatively assess the performance of certain parameters of the integrated computing system 116. Another example external test environment device 128 may include an adjustable power source to test the performance of the integrated computing system 116 under various non-ideal power conditions (e.g., brown out, power factor inconsistencies, power glitches, lightning strikes, etc.), or other environmental control systems, such as climate control systems to test how well the integrated computing system 116 performs when subjected to climatic extremes, such as hot/cold temperatures, excessive humidity, and the like.

FIG. 1B illustrates an example test-based integrated computing system object instance 114 that may be generated by the tool 108 according to one embodiment of the present disclosure. The test-based integrated computing system object instance 114 is a logical construct that represents the integrated computing system 116 in an object oriented form. That is, the test-based integrated computing system object instance 114 uses object-oriented principles of abstraction, encapsulation, composition, inheritance, and/or polymorphism to define relationships between the resources 130 of the integrated computing system 116. The test-based integrated computing system object instance 114 provides information about the relationships among the constituent resources 130 of the integrated computing system 116 to enable the tool 108 to adequately assess whether certain performance objectives are met for the integrated computing system 116. That is, the integrated computing system object model 138 from which the test-based integrated computing system object instance 114 is generated imparts contextual, relationship information about each resource 130 that may be used by the tool 108 to ensure that any applicable performance rules for each of those resources 130 are adequately met. Information associated with how the tool 108 is enabled to adequately assess whether certain performance objectives are met for the integrated computing system 116 will be discussed in detail herein below.

In general, the test procedure management tool 108 generates the test-based integrated computing system object instance 114, and identifies, using a sub-object instance 118 corresponding to each resource 130 in the integrated computing system 116, one or more criteria associated with that sub-object instance 118. Once the criteria has been identified, the tool 108 may then generate one or more test procedures 124 that can be used to verify proper operation of each resource 130 associated with the sub-object instance 118 according to the one or more criteria in which each test procedure includes at least one action to be administered for verifying proper operation of the resource. The test procedures 124 may then be stored in a human readable test plan 126 and/or used to automatically conduct the test procedures 124 by communicating with the integrated computing system 116 and/or external test environment devices 128.

The test-based integrated computing system object instance 114 is created from a customized integrated computing system object instance 134. In one embodiment, the customized integrated computing system object instance 134 may be obtained in any suitable manner. In one example, the tool 108 may perform a discovery process to obtain configuration information from the resources 130 of the integrated computing system 116 and the configuration information processed to create the customized integrated computing system object instance 134 that represents the configuration of the integrated computing system 116. In another example, the tool 108 may obtain the object instance 134 from another separate system that has generated the customized integrated computing system object instance 134 independently of the test procedure management system 100. Additionally, the customized integrated computing system object instance 134 may be obtained from a specification of an integrated computing system that has not been deployed. For example, the tool 108 may receive a specification that defines the configuration of an integrated computing system 116 from a separate integrated computing system design tool, and generate the customized integrated computing system object instance 134 according to the received specification. Hence, the customized integrated computing system object instance 134 is effectively defined by the tool 108, irrespective of whether the various resources 130 (e.g., compute resources, storage resources, network resources, etc.) have been physically integrated and assembled into a functioning integrated computing system. Once the test-based integrated computing system object instance 114 is created, it may be used to test each resource 130 in the integrated computing system 116, and produce a test results report 144 indicating which test procedures 124 have passed and which test procedures 124 have failed.

The test procedures 124 describe one or more actions that may be performed to verify the performance criteria of each resource 130 to ensure certain performance objectives are met. The performance criteria may be ascertained from any suitable source. For example, the performance criteria may be obtained from a requirements document associated with the integrated computing system 116, such as one provided from a customer for whom the integrated computing system 116 is being designed and constructed. As another example, the performance criteria may be obtained from other documentation associated with the integrated computing system 116, such as a physical build guide detailing how the integrated computing system 116 it to be physically assembled, and/or a logical build guide detailing how the integrated computing system 116 is to be installed with software and configured for operation. As yet another example, the performance criteria may be obtained from information included in the integrated computing system object model 138, such as criteria associated with dependency information in certain sub-object instances 118 of the customized integrated computing system object instance 134. As yet another example, the criteria may be manually obtained from a user interface, such as that received from a user, which is based upon expert knowledge known about certain resources 130 of the integrated computing system 116.

The test-based integrated computing system object instance 114 stores test procedures 124 used to verify performance of each of the resources in the integrated computing system 116. Once generated, the test-based integrated computing system object instance 114 may be exported as a human readable test plan 126 that can be used for manually conducting the test procedures 124 associated with each resource 130 in the integrated computing system 116. The test-based integrated computing system object instance 114 may also be accessed by the tool 108 to automatically conduct the test procedures 124 on the resources 130 of the integrated computing system 116. In one embodiment, the test-based integrated computing system object instance 114 may be exported as an extensible markup language (XML) formatted file that may be used by a third party tool that may be executed to test the performance of each resource 130 in the integrated computing system 116 against certain test performance objectives. For example, the tool 108 may export the test-based integrated computing system object instance 114 as an XML formatted file to an integrated computing system management application 110 that verifies each resource 130 in the integrated computing system 116 against the test procedures 124 and outputs the results of the verification. One example of such an integrated computing system management application includes a VCE VISION™ software suite that is available from DELL/EMC, LLC.

As shown, the integrated computing system 116 includes multiple sub-systems 120 that may each have one or more resources 130. The integrated computing system 116 may include any arrangement and number of resources 130 without departing from the spirit and scope of the present disclosure. The resources 130 of the integrated computing system 116 may refer to computing devices, such as hardware computing devices (e.g., hosts), virtual computing devices, or executable software, such as an operating system (OS) that perform some function for the overall operation of the integrated computing system 116. The resources may also include other communication devices, such as switches, routers, firewall appliances, or other communication device that facilitates communication among multiple other computing devices. The integrated computing system 116 may also include storage resources, such as storage arrays. For example, the integrated computing system 116 may be a converged infrastructure (CI). One particular example integrated computing system 116 that is embodied as a converged infrastructure is shown and described herein below with respect to FIGS. 2A and 2B.

The tool 108 generates the test-based integrated computing system object instance 114 from a customized integrated computing system object instance 134 stored in the data source 112. The customized integrated computing system object instance 134 represents the integrated computing system 116 as a unified entity. The customized integrated computing system object instance 134 is created as a specific instance of an integrated computing system object model 138 and may reflect an actual configuration information obtained from the integrated computing system 116. While the integrated computing system object model 138 is generic to a wide range of possible configurations and resource types found in integrated computing systems, the customized integrated computing system object instance 134 is specific to an actual configuration of a particular integrated computing system 116.

The integrated computing system object model 138 may be a class definition (e.g., a class, a set of sub-classes, methods, properties, etc.) implemented according to object-oriented principles, while the customized integrated computing system object instance 134 is a particular instantiation of the software class and its sub-classes, populated with configuration information obtained from each resource 130 in the integrated computing system 116. The integrated computing system object model 138 may be implemented as a database schema, such as a schema for a SQL database, such that the customized integrated computing system object instance 134 includes a particular collection of tables and relationships built in accordance with the schema and reflecting the configuration of the resources 130 in the integrated computing system 116. The database implementation may be useful in some instances because it provides the benefit of persistence. The database implementation allows the customized integrated computing system object instance 134 to be stored in non-volatile memory (e.g., the data source 112), which can be accessed for further processing at any desired time in the future.

In a particular example, the customized integrated computing system object instance 134 may be generated by instantiating a class for the system object and instantiating each of a first set of sub-object classes subordinate to the system object class. A resulting first set of sub-object instances 118 may each represent a different logical category of resources, such as 'storage,' 'compute,' and 'network,' sub-systems as would be found in a typical converged infrastructure. Any number of the first sub-object instances 118 can be provided. For example, a 'connectivity' sub-object instance 118 may be instantiated from the integrated computing system object model 138 to provide a category for cables and other connection resources. Additionally, a 'graphics' sub-object instance 118 can be instantiated from the integrated computing system object model 138 to provide a category for graphics processing units (GPUs) and other video streaming resources. It is emphasized that the categories represented by the first set of sub-object instances may be considered as logical constructs that form container structures for aggregating underlying physical resources of their respective container and, in some cases, may include logical resources or logical groups of physical resources (e.g., RAID groups, LUNs, clusters, etc.). In some examples, the categories themselves may include aggregate information about underlying resources, such as utilization, health, etc., which may not be obtained directly from the resources 130 of the integrated computing system 116.

Generating the customized integrated computing system object instance 134 may further include instantiating each of a second set of sub-object classes from the integrated computing system object model 138, to represent underlying physical resources 130 of the integrated computing system 116 in accordance with a second set of sub-object instances 118. For example, sub-classes of the integrated computing system object model 138 corresponding to particular physical resources (e.g., disk arrays, server blades, computing racks, etc.) may be instantiated to generate sub-object instances 118 that provide software models of the resources. In some examples, these sub-object instances 118 are similar to the software interfaces provided by the resource providers, but may include additional information and functionality. Also, unlike the software interfaces available from the providers, these second set of sub-object instances 118 fit within and are integrated with the overall customized integrated computing system object instance 134. It is understood that the second set of sub-object instances 118 refer to respective physical resources and can thus be regarded as software implementations of physical models, or 'physical' instances, which differ from the logical instances in the first set of sub-object instances.

In some examples, the software models in the second set of sub-object instances 118 may be generic models that represent respective physical resource types but are not particular to specific vendor makes or models. For example, a software model for a resource type (e.g., a server blade) is constructed generically, so as to be effective in representing a range of different vendor makes and models of resources of that type. Thus, the sub-object instance for a resource is generated from a generic object class but is customized with particular attribute values such that the resulting software model is specific to the particular resource.

The customized integrated computing system object instance 134 and some, most, or all sub-object instances 118 may be populated with one or more attributes based upon the configuration data obtained for its respective resource 130. For example, the tool 108 may populate a sub-object instance 118 with an attribute indicating that a compute resource 130 is configured with 4 GB of RAM storage.

According to embodiments of the present disclosure, the tool 108 may modify each sub-object instance 118 to include one or more test procedures 124 associated with a security hardening standard. The tool 108 may process the customized integrated computing system object instance 134 and each sub-object instance 118 and populate each with certain test procedures 124 according to their relevance to the test procedures 124 of the security hardening standard. For example, if the security hardening standard specifies a requirement that specifies a minimum amount of random access memory for a certain type of resource, the tool 108 may process the customized integrated computing system object instance 134 to determine which sub-object instances 118 are of that type, and populate those sub-object instances 118 with test procedures 124 that can later be used to verify performance of its respective resource 130 against the test procedure 124.

The customized integrated computing system object instance 134 can include logical and physical sub-object instances at various (e.g., hierarchal) levels. For example, it may be possible for a sub-object instance representing a storage array (a physical entity), which resides under the 'storage' category (a logical entity) to be included in the object instance hierarchy of logical object instances, such as logical unit numbers (LUNs), virtual storage area networks (VSANs), and RAID groups. Further, any number of storage arrays, or portions thereof, can be grouped in one or more resource pools, which can be represented under the storage category of the customized integrated computing system object instance 134 as respective logical object instances. Also, it is possible for an object instance representing a compute rack (a physical entity), which resides under the 'compute' category (a logical entity) to include logical object instances such as virtual compute blades. Further, it is possible for an object instance representing a network rack (a physical entity), which resides under the 'network' category (a logical entity) to include logical object instances such as virtual network interface cards (VNICs) and virtual local area networks (VLANs).

The data source 112 stores integrated computing system information 136, at least one customized integrated computing system object model 138, at least one customized integrated computing system object instance 134, at least one test-based integrated computing system object instance 114, integrated computing system related documentation 140, pre-defined test procedures 142, and one or more test result reports 144. The integrated computing system information 136 stores raw configuration information about the integrated computing system 116, such as a number and type of each resource 130 implemented in the integrated computing system 116. The integrated computing system object model 138 is generic to a wide range of possible configurations and resource types found in integrated computing systems, while customized integrated computing system object instance 134 is specific to the actual configuration and resource types of a particular integrated computing system 116. The test-based integrated computing system object instance 114 generally includes a customized integrated computing system object instance 134 that has been modified by the test procedure management tool 108 to include test procedures 124. The integrated computing system related documentation includes documentation that may be used to obtain criteria for the test procedures generated by the tool 108. Examples of documentation may include a requirements document obtained from a customer of the integrated computing system 116, a physical build guide detailing how the integrated computing system 116 it to be physically assembled, and/or a logical build guide detailing how the integrated computing system 116 is to be installed with software and configured for operation.

The pre-defined test procedures 142 generally includes previously generated test procedures that are associated with particular types of resources 130. For example, the predefined test procedures 124 may include a set of test procedures 124 that are to be performed on a certain make and model of compute blade resource 130. Thus, when the tool 108 encounters that make and model of compute blade resource 130, it may obtain that set of pre-defined test procedures 124 to augment the test-based integrated computing system object instance 114.

The test procedure management computing device 102 and the integrated computing system 116 communicate with one another in any suitable manner, including but not limited to, wired, wireless, and/or optical communications networks. In one embodiment, the test procedure management computing device 102 and the integrated computing system 116 communicates with one another using a communication network, such as an intranet, LAN, virtual LAN or VLAN, wide area network or WAN, or another wired and/or potentially wireless communication network as required for the proper function of the system. In another embodiment, the management computing system 102 and integrated computing system 116 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the test procedure management computing device 102 and integrated computing system 116 may communicate with one another without the use of a separate and a distinct network. Additionally, other embodiments contemplate that the modules employed by the integrated computing system management application 110 are executed by a computing device configured on the integrated computing system 116.

Figure 2A:
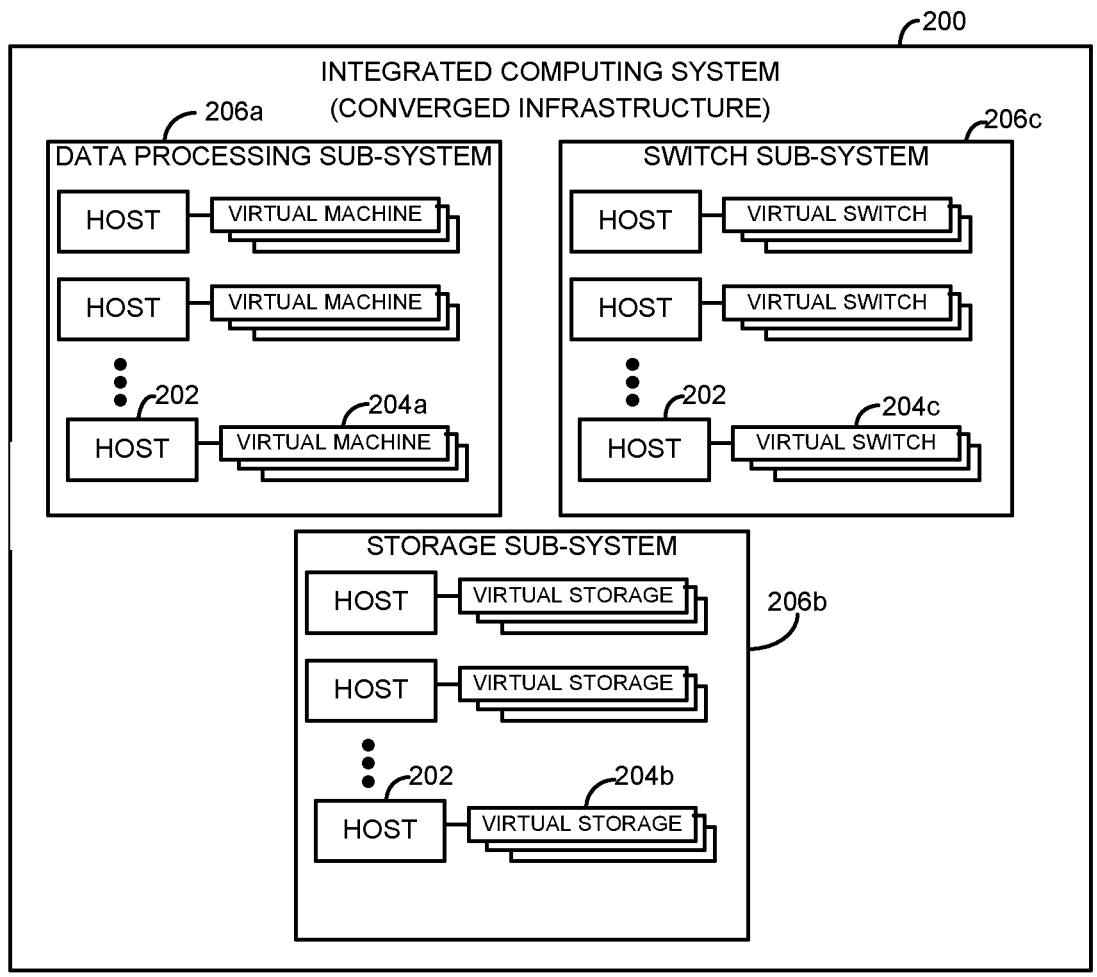
FIGS. 2A and 2B illustrate an example integrated computing system embodied as a converged infrastructure according to one embodiment of the present disclosure.

FIG. 2A illustrates an example converged infrastructure 200 that may provide multiple computing resources 130 to be monitored by the system 100 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or resource that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure 200 such as that shown includes resources found in Vblock™ System infrastructure packages available from DELL/EMC, LLC, which is located in Hopkinton, Mass.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include resources, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more workloads or one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Referring again now to FIG. 1, the integrated computing system management application 110 manages various activities of the integrated computing system 114 and may also manage operation of the hosts 202 and virtual objects 204 of the converged infrastructure 200. For example, the integrated computing system management application 110 manages the allocation and de-allocation of resources, such as hosts and virtual objects used by the system. Additionally, the integrated computing system management application 110 may manage the remediation of failures in the system by monitoring the health of each resource and performing corrective measures, such as migration (e.g., failover) to different resources in the event that certain resources have failed or are malfunctioning in some way.

Figure 2B:
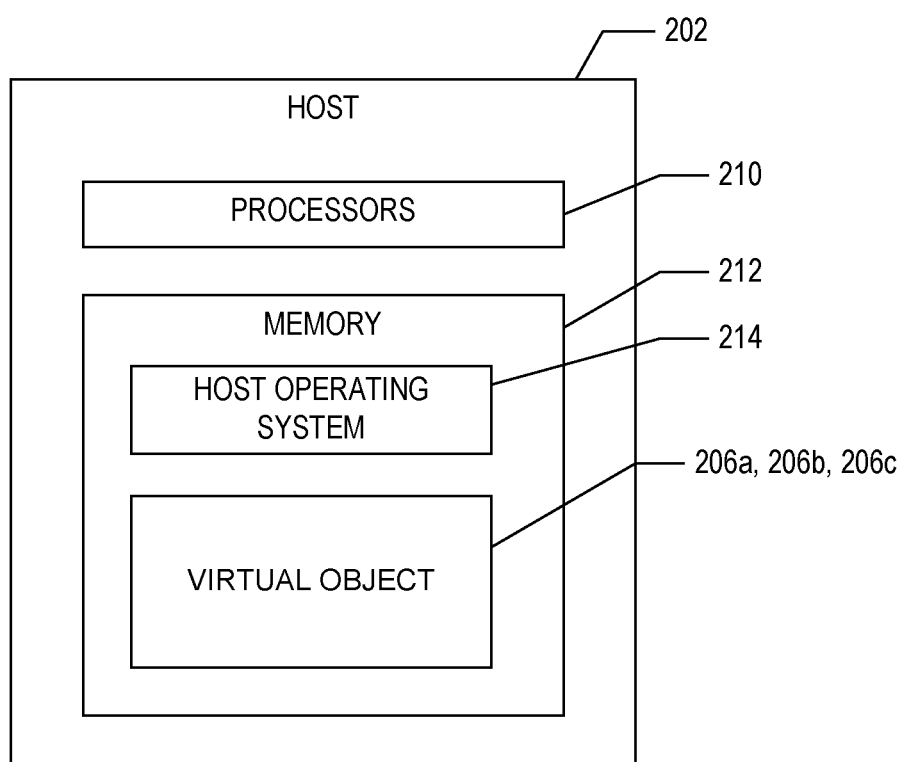

FIG. 2B illustrates an example host 202 implemented on each converged infrastructure 200 according to one aspect of the test procedure management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more workloads or virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the workloads or virtual objects (e.g., VMs 204a, virtual storage objects 204b, and virtual switch objects 204c) may be implemented as resources 130 of the integrated computing system 116. Each virtual object may be instantiated or deleted under control of the host operating system 214, which is in turn, controlled by the integrated computing system management application 110. That is, the host operating system 214 may be controlled by the integrated computing system management application 110 to instantiate new virtual objects are they are needed and destroyed to alleviate excess capacity in their associated hosts 202. Although the present embodiment discloses one particular type of computing structure that may be implemented as a multi-tier computing environment, it should be understood that any computing environment that may adjust, add, and/or delete resources according to the needs of applications executed on the computing environments may be viable alternatives.

Figure 3:
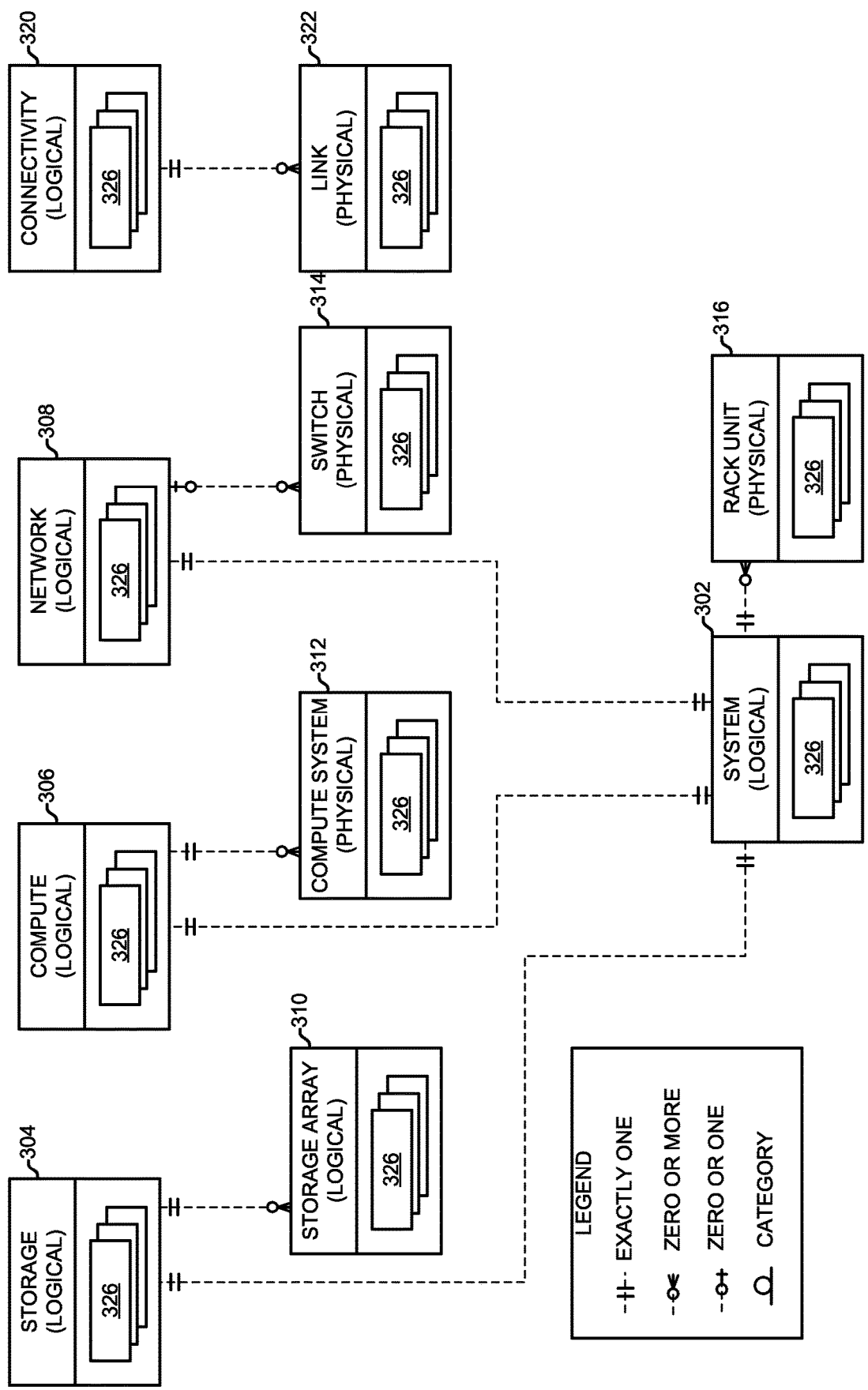
FIGS. 3 through 7 illustrate an example integrated computing system object model that may be used to create an integrated computing system object instance representing an integrated computing system according to one embodiment of the present disclosure.

FIGS. 3 through 7 illustrate an example integrated computing system object model 138 that may be used to create an customized integrated computing system object instance 134 representing an integrated computing system 116, such as the converged infrastructure 200 as shown and described above with respect to FIGS. 2A and 2B. FIG. 3 includes a legend indicating one of various meanings of different symbols used these figures. Various relationships are shown with dashed lines to indicate that the relationships can vary between different objects and that the relationships may be non-existent in certain configurations. Additionally, each object as shown in FIGS. 3 through 7 may include one or more attributes that may each be populated with information about its respective object, such as a unique identifier that uniquely associates its respective object to a resource 130 of the integrated computing system 116. According to embodiments of the present disclosure, the attributes 326 may also include information about one or more test procedures 124 that are associated with its respective sub-object instance 118 created from its object.

As shown in FIG. 3, a system object 302 represents an integrated computing system 116 that in this particular case is a Vblock™ system that is available from DELL/EMC, LLC, which is located in Hopkinton, Mass.

The system object 302 (along with its sub-objects) may be instantiated to generate the customized integrated computing system object instance 134. A first set of sub-objects are shown in one-to-one relationships with the system object 302. These sub-objects may be provided as children of the system object 302 and include a storage object 304, a compute object 306, and a network object 308. The objects 304, 306, and 308 are logical objects, as they do not themselves directly represent any individual physical hardware resources but rather serve as aggregating objects, which include other objects that directly represent hardware. For example, the storage object 304 may include instances of a storage array object 310, which provides a software model for a physical storage array, such as an EMC Symmetrix or VNX storage array. As indicated by the E-R notation, the storage object 304 can reference zero or more storage array instances instantiated from the storage array object 310, that is, the object model may support any quantity of storage arrays. Similar relationships are shown for the compute object 306, which can include any number of instances of a physical compute system object 312, and for the network object 308, which can include any number of instances of a physical switch object 314.

In the example shown, the system object 302 can also include any number of rack unit objects 316. It is noted that rack unit objects do not necessarily belong to any particular class. Objects for certain resources, such as power supply units (PSUs) and sensors, may similarly be provided outside the scope of any class. In an alternative arrangement, another class object may be provided for racks, which includes any number of physical rack unit objects 316 as sub-objects.

In an example, the objects shown in FIG. 3 are part of a base model or super class (not shown), from which the objects of FIG. 3 inherit various common properties and/or methods. The use of a base class may avoid duplication of code and provides a construct for associating objects that do not have direct constrained relationships. For example, a connectivity object 320 is provided without any identified parent. Rather, the connectivity object 320 is a member of the base class and thus shares a common software structure with the other objects. In this particular example, the connectivity object 320 is configurable to have a number of different parent objects, such as the switch object 308, the compute object 306, or a number of other objects. In the example shown, the connectivity object 320 is a logical object, which can include any number of physical link objects 322. In general, link objects 322 refer to cables.

The objects shown in FIG. 3 can each have any number of methods and/or properties. The properties include attributes 326, whose values are assigned to instances when the customized integrated computing system object instance 134 is generated. Each object may have an attribute for a model identifier (MOID), which is assigned a unique value, such as a globally unique ID (GUID). Although few examples of object attributes are shown in FIG. 3, it is understood that objects typically have hundreds or more attributes. For generic objects representing hardware (e.g., racks, server blades, disks, etc.), the attributes serve to tailor the respective object instances instantiated from those objects to the particular characteristics of the makes or models of the underlying hardware that the object instances represent. The attributes 326 can specify health, performance, and relationships to other resources (e.g., parent objects, containment within racks, etc.). Attributes 326 can also store physical location information, such as GPS coordinates, building address where installed, and location within a data center. In some examples, attributes specify other characteristics generated by the tool 108 but not provided directly from the resource during discovery. In some examples, the attributes may store logical information, such as membership in RAID groups, LUNs, or computing clusters.

Figure 4:
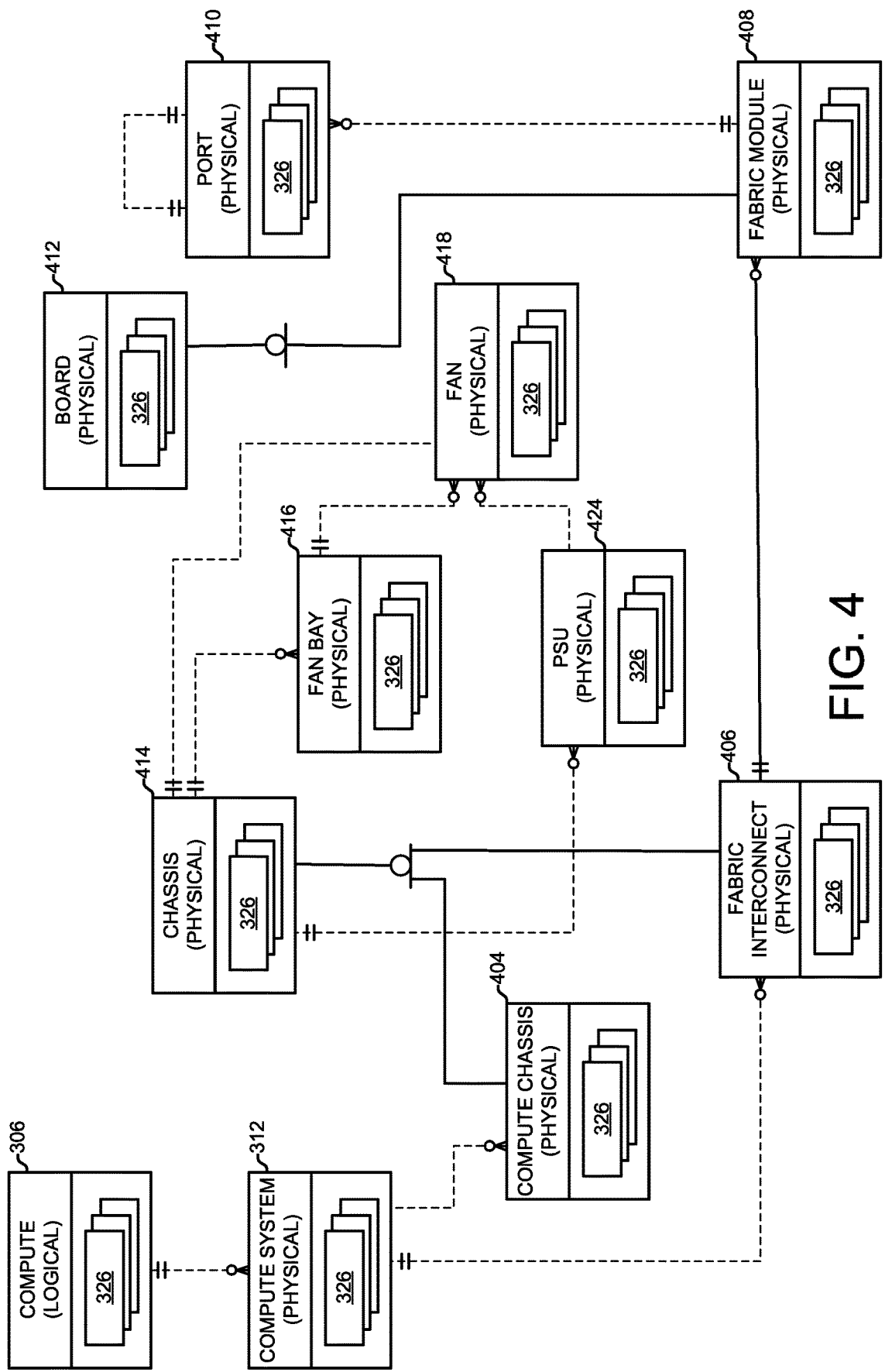

FIG. 4 shows an example arrangement of compute objects associated with a compute sub-system 120 that may form a portion of the resources 130 of the integrated computing system 116 of FIGS. 2A and 2B. The compute object 306 may include any number of compute system (physical) objects 312. Each compute system object 312 can include any number of compute chassis objects 404, and any number of fabric interconnect objects 406. Each fabric interconnect object 406 can include any number of fabric module objects 408, which can include any number of port objects 410. The fabric module objects 408 are a category of board objects 412. Also, the compute chassis objects 404 and fabric interconnect objects 406 are categories of a chassis object 414. The chassis object 414 can include any number of fan bay objects 416 and any number of fan objects 418. Also, the fan bay object 416 can include any number of fan objects 418. The chassis object 404 also includes any number of PSU (power supply unit) objects 424, which in turn may include any number of fan objects 418.

The arrangement of objects in FIG. 4 displays the flexibility of the integrated computing system object model 138 in representing a variety of system configurations. For example, the variable arrangement of fan bay objects 416 and fan objects 418 reflects the fact that some chassis include individual fans whereas others include fan bays having multiple fans. The arrangement of FIG. 4 also shows that some of the objects of the object model 138 are reusable in different contexts. For example, the same fan object 418 may be used to represent a fan in a fan bay of a chassis, a fan of a chassis without reference to any fan bay, and the fan of a power supply unit. In any particular integrated computing system object instance, these objects can be instantiated in a manner consistent with the particular configuration, with the object instances forming building blocks that can be used as needed in different contexts.

Figure 5:
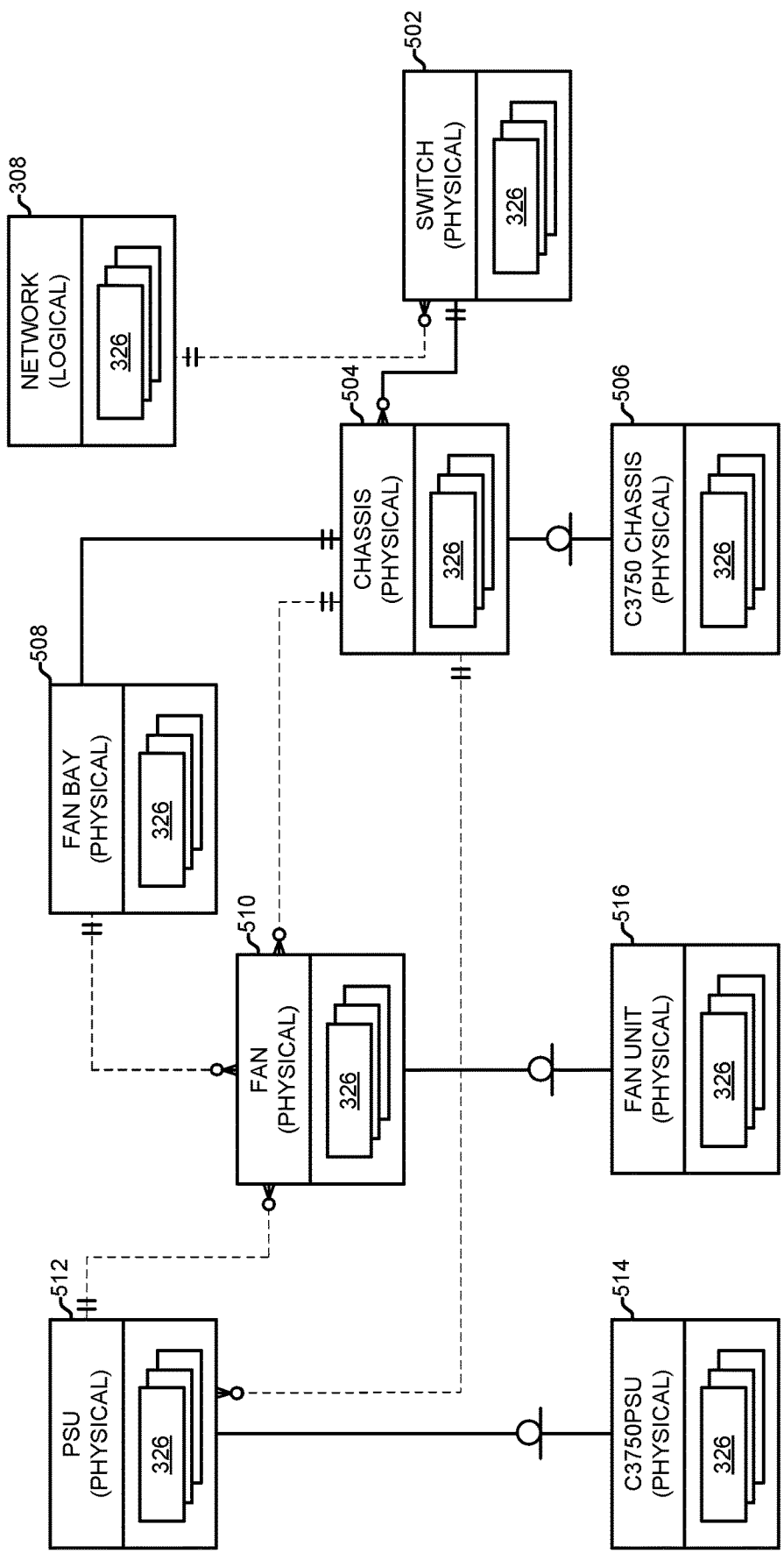

FIG. 5 shows an example arrangement of network objects of the network sub-system 308 that may form a portion of the resources 130 of the integrated computing system 116 of FIGS. 2A and 2B. The network object 308 may include any number of switch objects 502. The switch object 502 includes any number of chassis objects 504. One particular category of the chassis object 504 is a C3750 chassis object 506. The chassis object 506 includes any number of fan bay objects 508 as well as any number of fan objects 510. In some arrangements, each fan bay object 508 includes any number of fan objects 510. Also, the chassis object 504 can include any number of PSU objects 512, each of which in turn can include any number of fan objects 510. One category of the PSU object 512 may include a C3750PSU object 514, which is a particular type of PSU. A category of the fan object 510 may also include a C3750 fan unit object 516. It is seen from FIG. 5 that the certain objects that form building blocks for one classification can also be used as building blocks in another classification. Such objects forming building blocks are thus not constrained to any classification and can be used throughout the object model.

Figure 6:
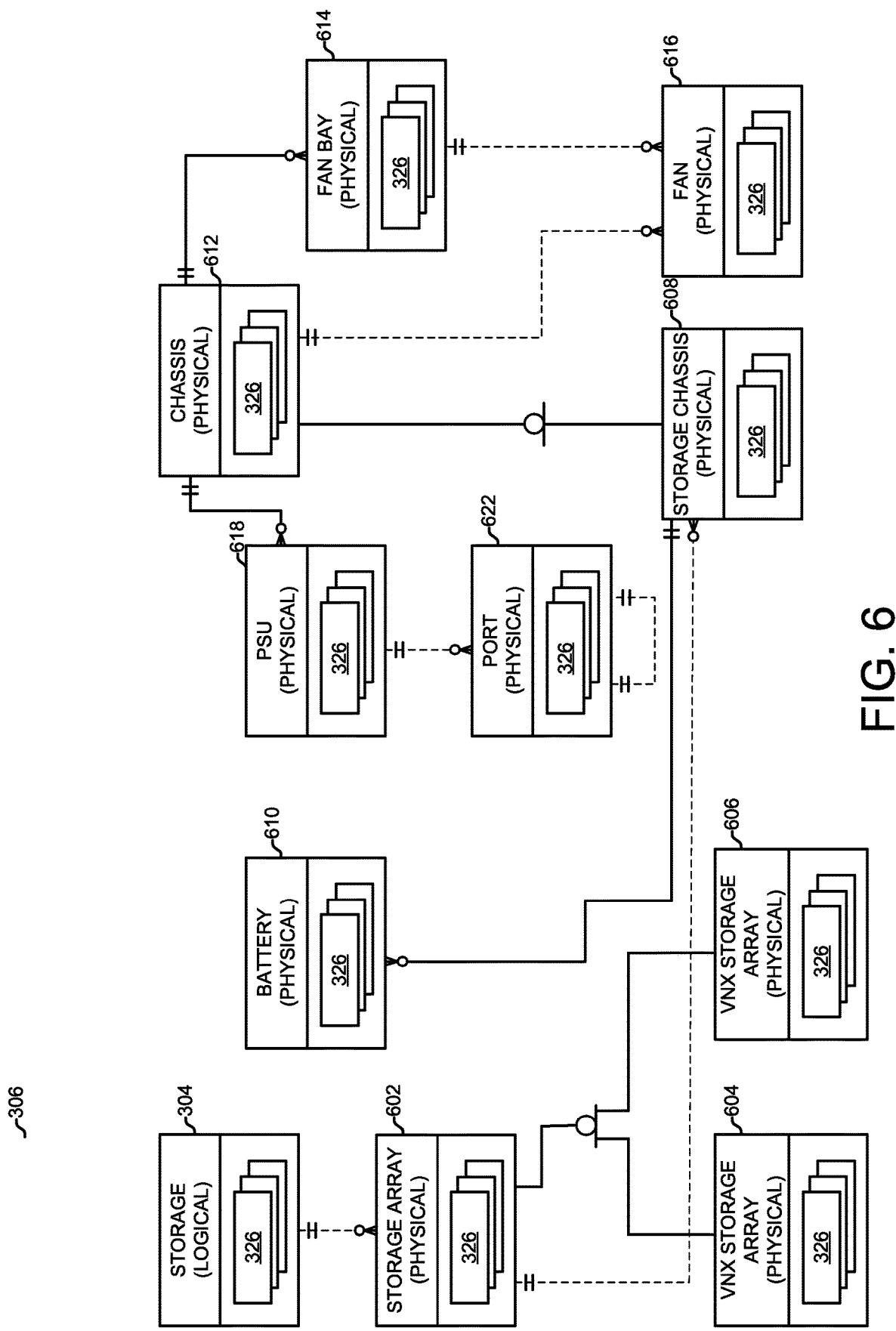

FIG. 6 shows an example arrangement of several storage objects of a storage sub-system 304 that may form a portion of the storage resources 130 of the integrated computing system 116 of FIGS. 2A and 2B. Here, the storage object 304 may include any quantity of storage array objects 602. Categories of the storage array object 602 may include a VNX storage array object 604 and a VNX storage array object 606. Each storage array object 602 can include any number of storage chassis objects 608, each of which can include any number of battery objects 610. The chassis object 612 is shown as a category of the storage chassis object 608. The chassis object 612 can include any number of fan bay objects 614 and any number of fan objects 616. Each fan bay object 614 can include any number of fan objects 616. The chassis object 612 can include any number of PSU objects 618. The PSU object 616 can include any number of port objects 622, thus reflecting the fact that power supply units of storage chassis can include multiple ports. The arrangement of FIG. 6 further underscores the reusable nature of objects as building blocks, even in different system contexts, where customization of the generic building blocks is achieved by arranging object instances and populating their attributes based on discovery.

Figure 7:
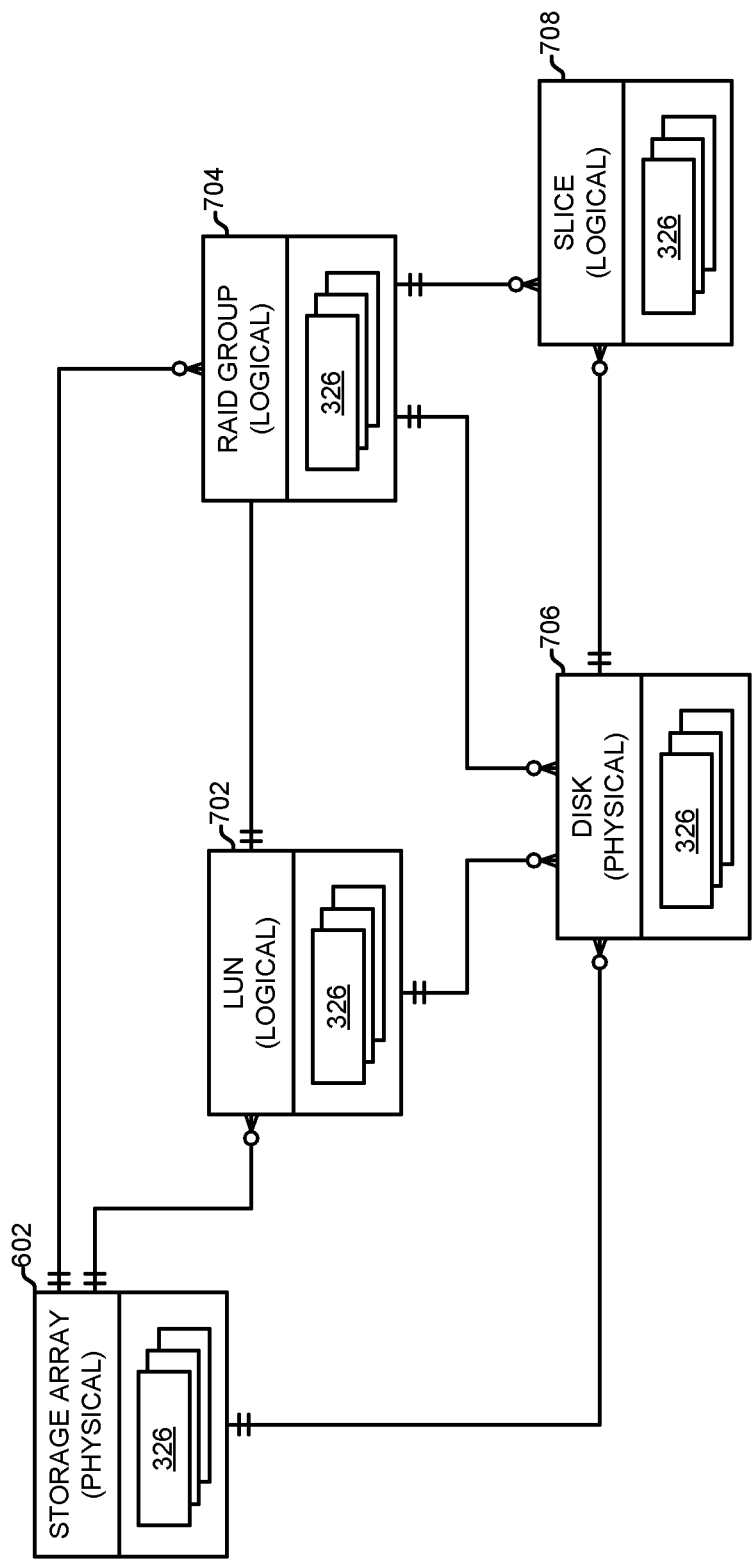

FIG. 7 shows an example storage diagram of physical and logical storage objects that may form a portion of the resources 130 of integrated computing system 116 of FIGS. 2A and 2B. Here, the storage array object 602 can reference any number of LUN objects 702, which in turn can each reference any number of RAID group objects 704. Also, the storage array object 602 can directly reference any number of disk objects 706 and any number of RAID Group objects 704. Each disk object 706 can reference any number of slice objects 708. Also, each LUN object 702 and each RAID Group object 704 can reference any number of slice objects 708. The storage diagram thus shows how physical and logical objects can be used together as building blocks in the integrated computing system object model 138. Similar arrangements can be made for other objects, such as compute objects (e.g., logical compute blades) and network objects (e.g., VNICs, VLANs, etc.).

Using the integrated computing system object model 138, as shown by way of example in FIGS. 3-7, a particular customized integrated computing system object instance 134 can be generated and populated with actual discovered configuration information obtained from the resources of the integrated computing system 114. Owing to the generic nature of the integrated computing system object model 138, different integrated computing system object instances 118 can be generated to reflect different configurations of the integrated computing system 114, and indeed to reflect different electronic systems. In some arrangements, a single computerized apparatus can connect, e.g., over a network, with multiple electronic systems (e.g., multiple Vblock™ systems), where each electronic system is represented with a respective integrated computing system object instance. Each such integrated computing system object instance may have a different object identifier or OID and a different name attribute. In some examples, higher level objects are provided, such as a DataCenter object, which includes multiple system objects.

Figure 8:
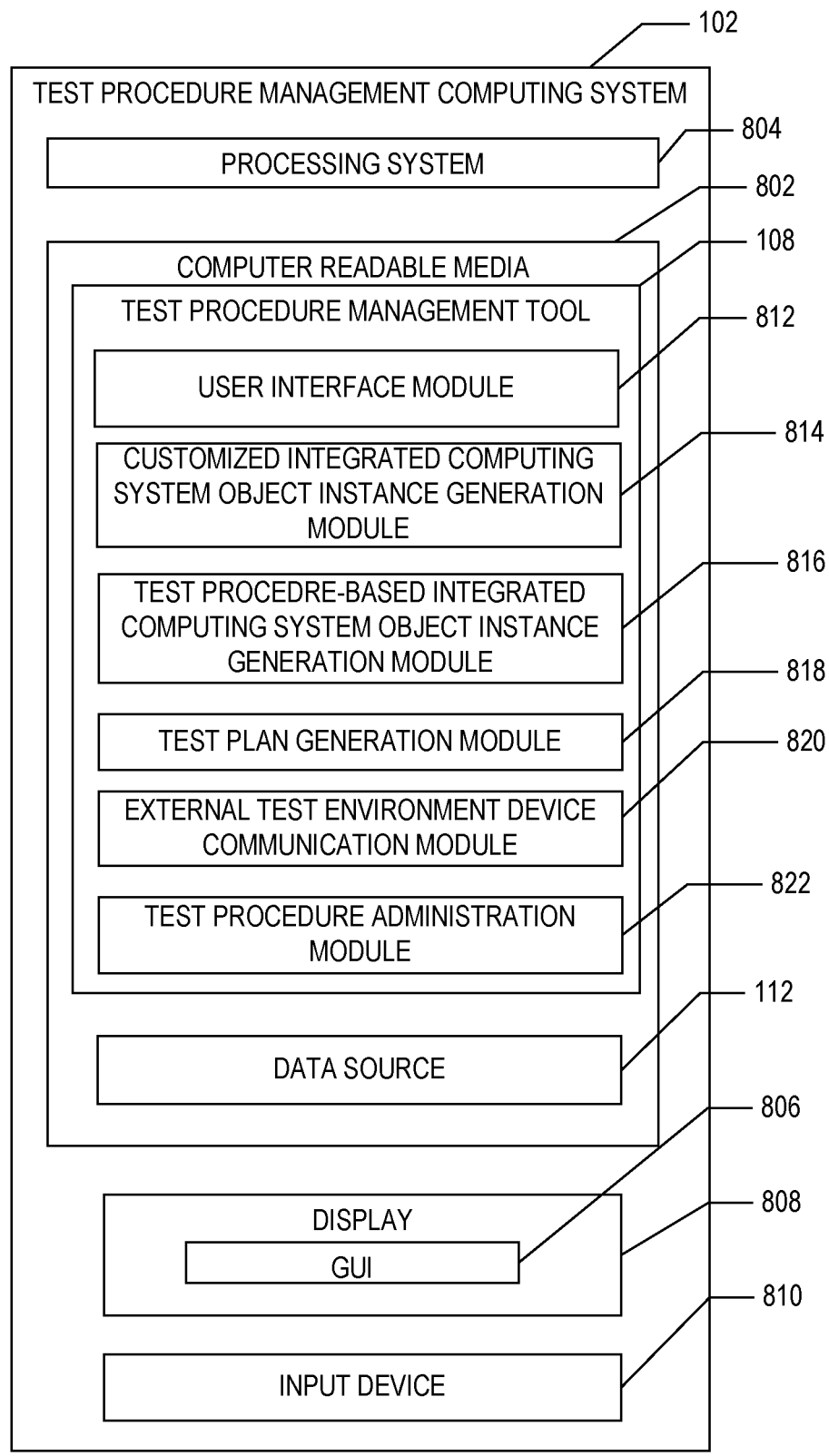
FIG. 8 is a block diagram depicting an example test management tool executed on the test management computing device according to one embodiment of the present disclosure.

Referring now in more detail to FIG. 8, a block diagram of an example test procedure management tool 108 executed on the management computing system 102 is depicted according to one aspect of the present disclosure. The test procedure management tool 108 is stored in a computer readable media 802 (e.g., memory) and is executed on a processing system 804 of the management computing system 102.

For example, the test procedure management tool 108 may include instructions that may be executed in an operating system environment, such as a Microsoft Windows™ operating system, a Linux operating system, or a UNIX operating system environment. As another example, the test procedure management tool 108 may be a Java™ or HTML5 based application that is executed within a web browser, such as a Firefox™ web browser.

The computer readable medium 802 includes volatile media, nonvolatile media, removable media, non-removable media, and/or another available medium. By way of example and not limitation, non-transitory computer readable medium 802 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the test procedure management computing device 102 also includes a graphical user interface (GUI) 806 displayed on the display 808, such as a computer monitor, for displaying data. The test procedure management computing device 102 also includes an input device 810, such as a keyboard or a pointing device (e.g., a mouse, trackball, pen, or touch screen) to enter data into or interact with the GUI 806. According to one aspect, the test procedure management tool 108 includes instructions or modules that are executable by the processing system 802 as will be described in detail herein below.

A user interface module 812 facilitates the receipt of input data and/or output data from or to a user, respectively. In one example, the user interface 806 may also receive user input for manipulating or otherwise modifying the operation of the test procedure management tool 108. As another example, the user interface 806 may receive user input for modifying and/or reviewing the test procedures 124 that are to be used by the tool 108. As yet another example, the user interface 806 may be used to display the test results report 144 for view by the user.

A customized object instance generation module 814 generates a customized integrated computing system object instance 134 that represents the integrated computing system 116 from an object model 138. The customized integrated computing system object instance 134 generally reflects the actual configuration information discovered from the integrated computing system 116. While the object model 138 may be generic to a wide range of possible configurations and resource types found in integrated computing systems 116, the customized integrated computing system object instance 134 is specific to the actual configuration of the resources 130 of the integrated computing system 116. For example, the customized object instance generation module 814 may instantiate a class for the base object (e.g., root level object) and instantiating each of a first set of sub-object classes subordinate to the base object class in which a resulting first set of sub-object instances may each represent a different logical category (e.g., storage, compute, and network, etc.). The customized object instance generation module 814 may also access a second set of sub-object classes from the object model 138 to represent underlying physical resources of the integrated computing system 116 with a second set of sub-object instances. For example, sub-classes of the object model 138 corresponding to particular physical resources (e.g., disk arrays, server blades, racks, etc.) may be instantiated to generate object instances that are representative of their resource counterparts.

In one embodiment, the customized integrated computing system generation module 814 may collect information about the resources 130 in the integrated computing system 116 for creating the customized integrated computing system object instance 134. For example, the customized integrated computing system generation module 814 may communicate with the operations management application 110 to obtain information about the resources 130 as well as any performance information and/or characteristic information associated with each resource 130. The resources 130 may include those associated with an already deployed integrated computing system 116, or the resources 130 may include those associated with a specification to an integrated computing system 116 that has not yet been deployed. For cases in which the integrated computing system 116 has not been deployed, the integrated computing system 116 may be represented by a customized object instance 134, such as one that has been created by a system architect based upon one or more requirements as specified by a customer. For cases in which the integrated computing system 116 has already been fabricated, the resource information collection module 814 may perform a discovery process to obtain information about the resources 130 from an existing integrated computing system 116. The resources 130 of a fabricated integrated computing system 116 can potentially include a myriad of diverse configuration settings. Typically, the configuration information for a resource 130 includes some or all of the information that the resource's software interface normally supplies, as may be provided by its respective manufacturer. In some examples, the configuration information may include certain details about the resource, such as its physical location relative to other resources, its parent resource (e.g., a rack in which it is installed), and any logical groups to which it belongs, e.g., a RAID Group, a LUN (logical storage units), computing clusters, etc. In some examples, the details may also include computed summary information or metrics that describe the resource, which may be obtained from multiple separate pieces of information obtained from the resources and/or related resources, which describe, for example, the utilization of the resource, resource health (e.g., whether the resource appears to be functioning properly), and/or other information. In further examples, the configuration information may include user-specified metadata previously stored on or in connection with particular resources.

A test-based integrated computing system object instance generation module 816 creates a test-based integrated computing system object instance 114 from a customized integrated computing system object instance 114, which has been generated by the customized integrated computing system object instance generation module 814. In general, the test-based integrated computing system object instance module 816 augments the customized integrated computing system object instance 134 to include to include information about test procedures 124 for each of the resources 130 configured in the customized integrated computing system object instance 134. For example, the test-based integrated computing system object instance generation module 816 may include a test procedure 124 that specifies a particular electrical power redundancy arrangement to be maintained as an attribute of the base object of the object instance 118. The test-based integrated computing system object instance generation module 816 may also include a test procedure 124 that specifies a particular test action to be performed to ensure that a minimum memory capacity is available for a certain type of compute VM in each sub-object instance 118 representing the compute VMs in the integrated computing system 116.

A test plan generation module 818 generates a test plan 126 from the test-based integrated computing system object instance 114. In general, the test plan 126 includes the test procedures 124 stored in each sub-object instance 118 of the test-based integrated computing system object instance 114 in human readable form, such as in a document that describes each test procedure 124 in a list, and includes a detailed description on how to perform each test procedure 124 by a user. For example, the test plan generation module 818 may generate a XML document in which each test procedure 124 is organized in a manner to be formatted to be printed from a standard line printer, and/or displayed on a computer display for consumption by the user.

A external test environment device communication module 820 communicates with one or more external test environment devices 128 for providing a test environment for performing the test procedures 124 by the test procedure administration module 822, which is described in detail below. For example, the external test environment device communication module 820 may communicate with a network communication device that generates test traffic that can be fed into the communication ports of the integrated computing system 116 for testing the internal networking resources of the integrated computing system 116. As another example, the external test environment device communication module 820 may communicate with environmental control systems, such as climate control systems to test how well the integrated computing system 116 performs under various climate conditions (e.g., temperature, humidity, ambient electro-magnetic noise, etc.). Additionally, the external test environment device communication module 820 may be configured to obtain parametric values measured by one or more of the external test environment devices 128 to quantitatively assess the performance of certain parameters of the integrated computing system 116. For example, the external test environment device communication module 820 may communicate with the network communication device to obtain measurements associated with certain communication ports configured on the integrated computing system 116, such as bit error rate (BER), latency, jitter, excessive buffering, and the like.

A test procedure administration module 822 administers the operation of the integrated computing system 116 and/or the external test environment devices 128 to automatically perform the test procedures 124 in the test-based integrated computing system object instance 114. Moreover, the test procedure administration module 822 may be receive a user request, via the user interface module 812, to perform certain test procedures 124 in the test-based integrated computing system object instance 114, and control the integrated computing system 116 and/or certain external test environment devices 128 to conduct those test procedures 124. The user request may include all of the test procedures 124 in each of the sub-system object instances 118, a subset of the test procedures 124 in one or more of the sub-system object instances 118, or only one of the test procedures 124 in the test-based integrated computing system object instance 114. Additionally, the test procedure administration module 822 may conduct those test procedures 124 sequentially or a certain subset of those tests procedures 124 in parallel.

In a particular example, if certain hard drives (e.g., resources) are configured in a certain caching arrangement (e.g., a FAST cache arrangement), the test procedure 124 may include verifying whether those hard drives are configured in an appropriate manner for implementing that type of caching arrangement, such as ensuring that the drives are spread evenly across the available back-end buses, and that each hard drive is mirrored across the buses. Accordingly, the test procedure 124 may include a sequence of information requests to be issued to the integrated computing system 116 to obtain such information, compare the response with the expected configuration, and store the result of the test procedure 124 in the automatic test results report 144 in the data source 112.

In another particular example, if the storage sub-system 120 of the integrated computing system 116 is configured with a virtual storage pool, a test procedure 124 may include verifying that logical unit numbers (LUNs) configured for use in that virtual storage pool are not used in a reserved LUN pool, a clone private LUN, or a component of a physical (e.g., hard wired) LUN. Accordingly, the test procedure 124 may include a sequence of information requests to be issued to the integrated computing system 116 to obtain such information, compare the response with the expected configuration, and store the result of the test procedure 124 in the test results report 144 in the data source 112.

In yet another particular example, if requirements associated with the integrated computing system 116 require that a certain shut down sequence occur as a result of a brown out power condition, a test procedure 124 may include a sequence of steps including setting the voltage of a power source that powers the integrated computing system 116 to a fraction of its nominal level (e.g., 70 percent), and issuing one or more information requests to the integrated computing system 116 indicating that the shutdown sequence is properly executed by the integrated computing system 116 as a result of the brown out condition. The test procedure administration module 822 may perform this test procedure 124 by communicating with a power source external test environment device 128, via the external test environment device communication module 820, to provide the brown out condition, and communicate with the integrated computing system 116 to ensure that the proper shut down sequence is performed by the integrated computing system 116, and store the results of the test procedure 124 in the test results report 144.

It should be appreciated that the modules described herein are provided only as examples, and that the tool 108 may have different modules, additional modules, or fewer modules than those described herein. For example, one or more modules as described in FIG. 8 may be combined into a single module. As another example, certain modules described herein may be encoded on, and executed on other computing systems, such as on one of the resources 130 of the integrated computing system 116.

Figure 9A:
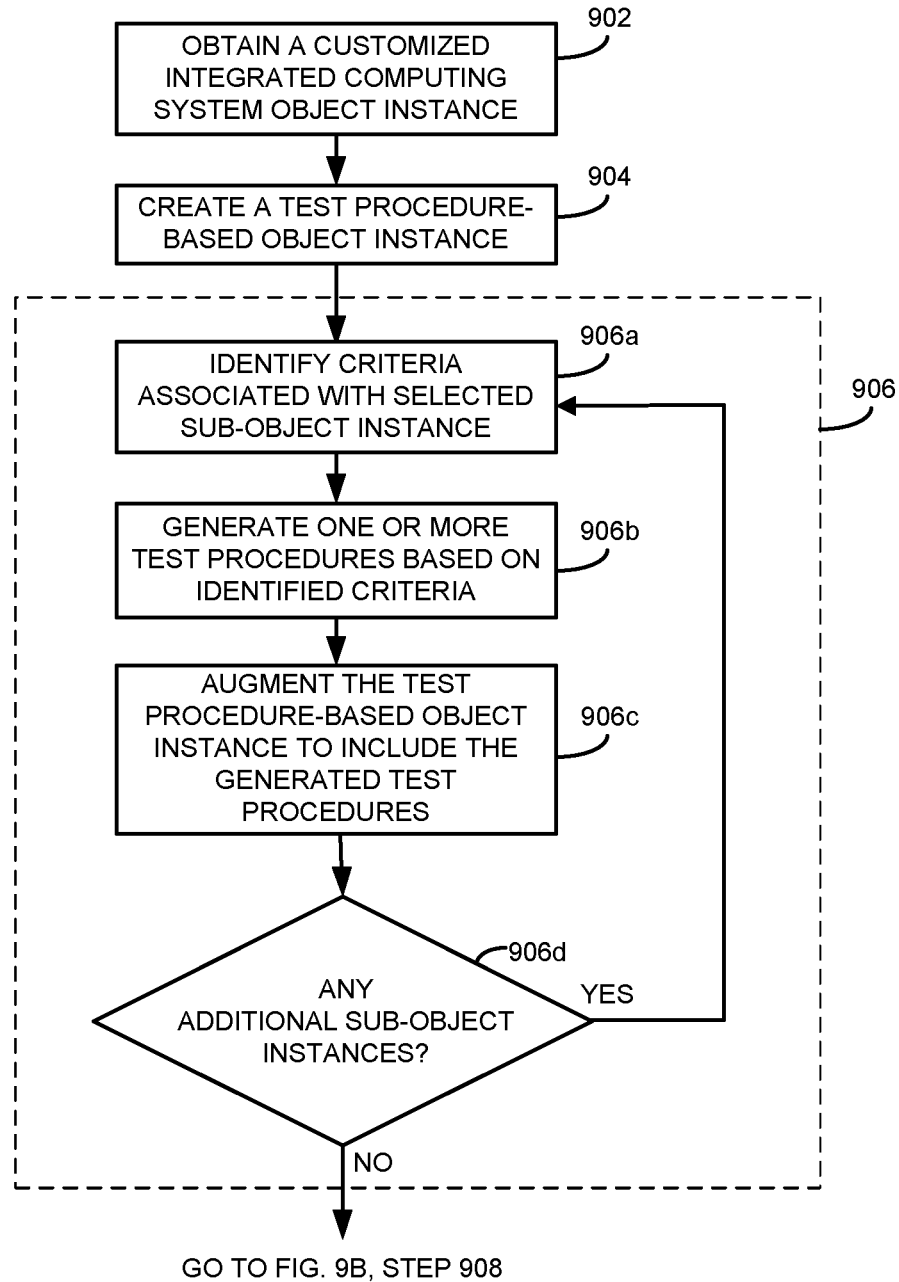
FIGS. 9A and 9B illustrate an example process that is performed by the test procedure management tool according to one embodiment of the present disclosure.
Figure 9B:
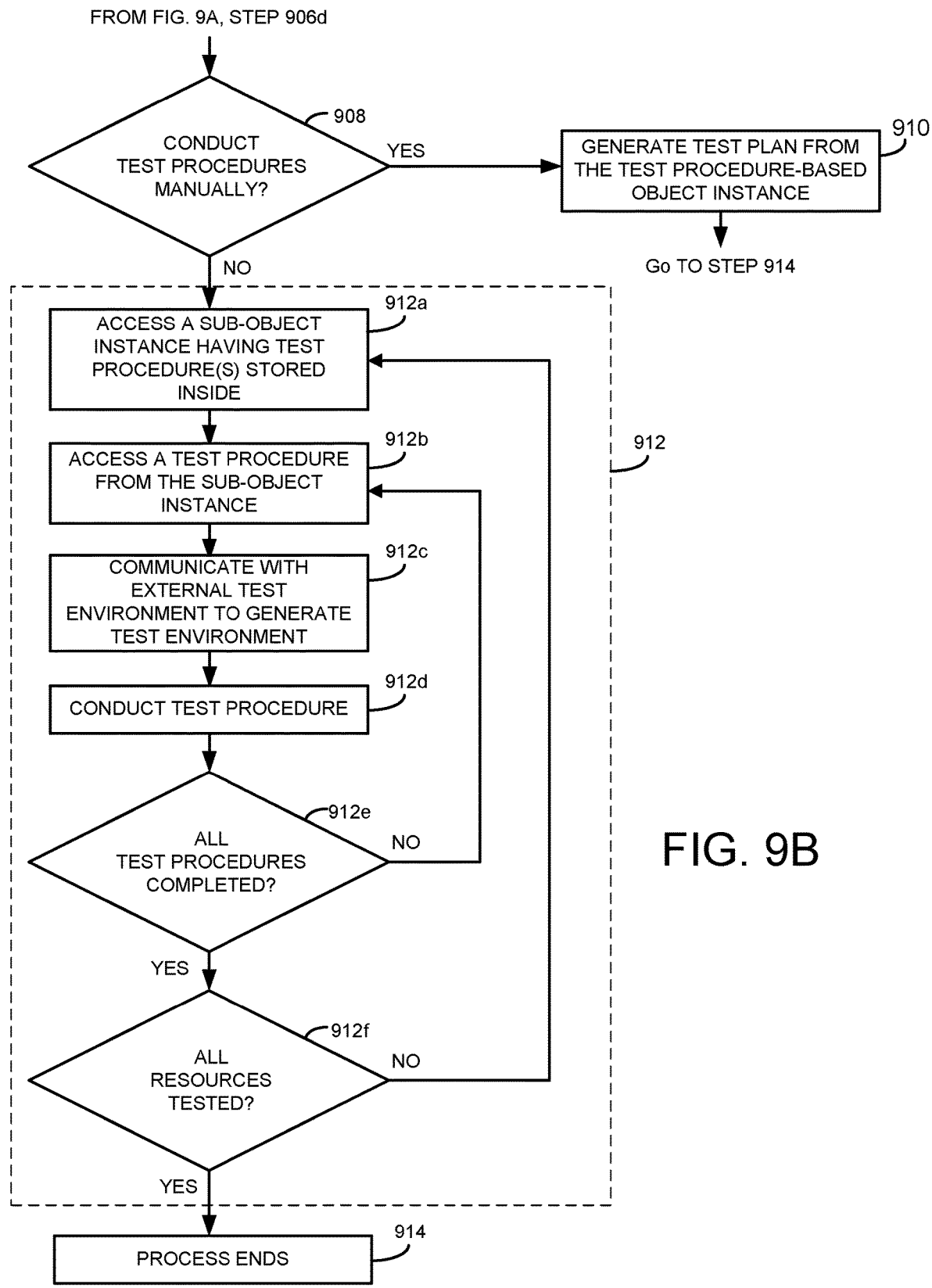

FIG. 9 illustrates an example process 900 that is performed by the test procedure management tool 108 to generate a test-based integrated computing system object instance 114, which can then be used to verify conformance of an integrated computing system associated with the test-based integrated computing system object instance against one or more performance objectives according to one embodiment of the present disclosure.

At step 902, the tool 108 obtains a customized integrated computing system object instance 134 associated with an integrated computing system 116. The integrated computing system 116 may be an existing (previously fabricated) integrated computing system, or the integrated computing system 116 may be one that has been designed, but not yet implemented. If the integrated computing system 116 has been previously fabricated, the customized integrated computing system object instance 134 may be generated according to a discovery process in which information about the resources 130 are gathered and combined to form the customized integrated computing system object instance 134. Once the customized integrated computing system object instance 134 is obtained, a test-based integrated computing system object instance may be generated as described herein below at steps 904*a* through 904*x*. In general, the tool 108 iteratively examines each sub-system object instance 118 in the customized integrated computing system object instance 134 against one or more test criteria to generate test procedures 124 for each sub-object instance 118 in the customized integrated computing system object instance 134. Once the customized integrated computing system object instance 134 is obtained, the tool 108 may create a test-based integrated computing system object instance from the customized object instance at step 904. For example, the tool 108 may create a copy of customized object instance and rename to test-based integrated computing system object instance, which is then stored in the data source 112. As another example, the tool 108 may rename the customized integrated computing system object instance 134 to be a test-based integrated computing system object instance 114 if an original copy of the customized object instance is no longer needed or desired.

The steps included in step 906 (e.g., steps 906*a* through 906*e*) describes steps performed by the tool to augment the newly created test-based integrated computing system object instance 114 to include test procedures 124 for each sub-object instance 118 therein. In general, the tool 108 iteratively examines each sub-system object instance 118 in the customized integrated computing system object instance 134 against one or more test criteria to generate test procedures 124 for each sub-object instance 118 in the customized integrated computing system object instance 134.

At step 906a, the tool 108 identifies one or more performance criteria associated with the sub-object instance 118. The performance criteria may be obtained from any suitable source of information. Examples of suitable sources include one or more requirements documents associated with the integrated computing system 116, a physical build guide, a logical build guide, information included in the integrated computing system object model 138 (e.g., dependency information in certain sub-object instances 118 of the integrated computing system object instance 134), manually obtained performance criteria from a user interface. For example, a requirements document for the integrated computing system 116 may include a particular requirement indicating that a resource 130 includes at least 4 Giga-Bytes (GB) or random access memory (RAM) storage. Given this requirement, the tool 108 may then augment the instance 118 to include a test procedure (e.g., function) to verify that the resource 130 is configured with at least 4 GB or RAM storage.

At step 906b, the tool 108 generates one or more test procedures 124 for the sub-object instance 118 based upon the identified performance criteria. At step 906c, the tool 108 augments the sub-object instance 118 to include the test procedures 124 generated at step 906b.

At step 906d, the tool 108 determines whether any additional sub-object instances 118 are to be augmented with test procedures 124. In one embodiment, the tool 108 may augment all, or only a subset of sub-object instances 118 with test procedures 124. For example, the tool 108 may be responsive to user input, via the user interface 812, to only generate test procedures 124 for a single sub-system (e.g., storage sub-system object instance). Thus, the tool 108 may sequentially traverse only the sub-object instances 118 in that single sub-system and augment its sub-object instances 118 with associated test procedures 124. Nevertheless, it should be appreciated that the tool 108 may be responsive to user input for augmenting any user-defined subset of sub-object instances 118 with test procedures 124 without departing from the spirit and scope of embodiments of the present disclosure. If additional sub-object instances 118 are to be augmented, processing continues at step 906a; otherwise, processing continues below at step 908.

At step 908, the tool 108 determines whether to automatically conduct the test procedures 124 on the integrated computing system 116 associated with the newly generated test-based integrated computing system object instance 114. If so, processing continues at step 912a; otherwise, processing continues at step 910 in which the tool 108 generates a test plan 126 in human readable form so that the test procedures 124 may be manually conducted via human intervention. In one embodiment, the tool 108 may be responsive to user input, via the user interface 806, for determining whether to automatically conduct the test procedures 124, or to generate a test plan 126 so that the test procedures 124 may be manually conducted.

Step 912 (e.g., steps 912a through 912f) describes the actions performed by the tool 108 for automatically conducting the test procedures 124 on the integrated computing system 116. In one embodiment, the tool 108 sequentially accesses each of the sub-object instances 118 having test procedures 124 stored therein, and performs each of the test procedures 124 until some, most, or all test procedures 124 stored in the test-based integrated computing system object instance 114 have been tested.

Although the steps 912a through 912f describe sequentially conducting the test procedures 124 stored in the test-based integrated computing system object instance 114, it should be appreciated that the tool 108 may simultaneously perform certain test procedures 124 in parallel. For example, a particular test procedure 124 generated for a hard drive storage disk sub-object instance 118 may generated to test the failover performance (e.g., RAID configuration) of its associated hard disk drive resource 130 when used in conjunction with certain other hard disk drive resources 130. In such a case, the test procedure 124 may include an indicator instructing the tool 108 to simultaneously conduct the test procedure 124 on each of the multiple hard disk drive resources 130 to verify whether the failover performance of the multiple hard disk drive resources 130 are adequately met. For example, the indicator may include information associated with a unique identity of each of the other hard disk drive resources 130 and/or a particular test scenario that each of the hard disk drive resources 130 are to undergo.

At step 912a, the tool 108 accesses a first object instance 118 having one or more test procedures 124 stored therein. Next, at step 912b, the tool accesses a first test procedure stored in the sub-object instance accessed at step 912a. At step 912c, the tool 108 communicates with one or more of the external test environment devices 128 to generate a test environment for the test procedure 124 accessed at step 912b. For example, the tool 108 may communicate with a piece of test equipment to begin generating test traffic into one or more communication ports of a networking resource 130 to simulate actual traffic that may be experienced by that networking resource 130. As another example, the tool 108 may communicate with an adjustable power source to lower its output voltage to 60 percent of its rated level so that the integrated computing system 116 may be tested under brown out conditions. At step 912d, the tool 108 conducts the test procedure 124 on the sub-object instance 118 based upon the information included in the test procedure 124, and stores the results of the test (e.g., pass/fail information, parametric information, etc.) in the test results report 144.

At step 912e, the tool determines whether all test procedures 124 in the sub-object instance 118 have been tested. If so, processing continues at step 912g; otherwise, processing continues at step 912b to access another test procedure 124 from the sub-object instance 118. Thereafter at step 912f, the tool determines whether all resources 130 associated with the sub-object instances 118 have been tested. If so, processing continues at step 912g in which the process ends; otherwise, processing continues at step 912a to access another sub-object instance 118.

The previous steps may be repeatedly performed for the same or other integrated computing systems 116 to test their performance against the same or different test procedures. Nevertheless, when use of the tool 108 is no longer needed or desired, the process ends.

Although FIG. 9 describes an examples of process that may be performed by the test procedure management tool 108 for verifying performance of an integrated computing system, the features of the disclosed process may be embodied in other specific forms without deviating from the spirit and scope of the present disclosure. For example, the test procedure management tool 108 may perform additional, fewer, or different operations than those operations as described in the present example. As another example, the steps of the process described herein may be performed by a system other than the test procedure management computing device 102, which may be, for example, one of the resources implemented in the integrated computing system 116.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 10:
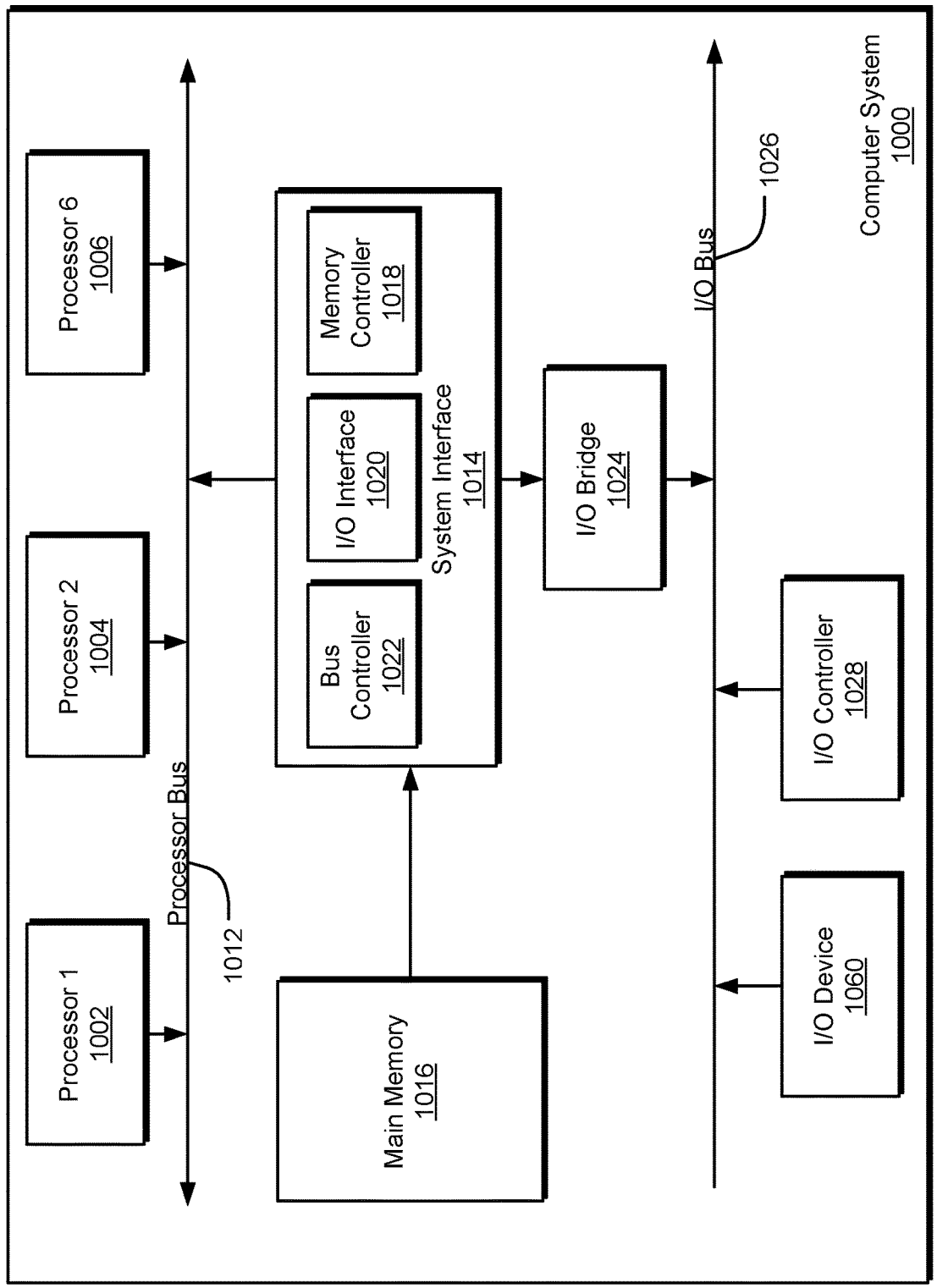
FIG. 10 is a block diagram illustrating an example of a computing device or computer system which may be used in implementing the embodiments of the present disclosure.

For example, FIG. 10 is a block diagram illustrating an example of a host or computer system 1000 which may be used in implementing the embodiments of the present disclosure. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other resources of the system 1000 with the processor bus 1012. For example, system interface 1014 may include a memory controller 1018 for interfacing a main memory 1016 with the processor bus 1012. The main memory 1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1060, as illustrated.

I/O device 1060 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other computer-readable devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software resources.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1016. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware resources or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the resources without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for use as part of a test management system for an integrated computing system, the system comprising:
at least one memory storing instructions that are executed by at least one processor to:
obtain a first object instance of the integrated computing system, the first object instance generated by applying configuration attributes of the integrated computing system to an object model of the integrated computing system, the first object instance including a plurality of hierarchically arranged first sub-object instances comprising a plurality of hierarchically arranged logical representations of physical resources of the integrated computing system;
generate a second object instance from the first object instance, the second object instance comprising a plurality of hierarchically arranged second sub-object instances, each second sub-object instance corresponding to a respective sub-object instance of the plurality of hierarchically arranged first sub-object instances and comprising a software implementation of a physical model of a respective hierarchically arranged physical resource, wherein the software implementation of the physical model differs from the logical representation of the physical resource;
identify one or more criteria associated with each second sub-object instance, the one or more criteria comprising interdependency information between the plurality of hierarchically arranged first sub-object instances;
generate respective test procedures to verify proper operation of the physical resources associated with the second sub-object instances according to the one or more criteria, the respective test procedures comprising instructions to be sent to one or more external devices comprising at least one power source, and inputs to the physical resources of the integrated computing system to obtain test results from the physical resources of the integrated computing system;
modify each second sub-object instance comprising the software implementation of the physical model of the respective hierarchically arranged physical resource to include one or more of the respective test procedures corresponding to the associated physical resource of the modified second sub-object instance; and
operate the at least one power source according to the respective test procedures of the second sub-object instance, wherein success or failure of the respective test procedures is determined based on a response of the physical resources of the integrated computing system to the inputs.

2. The system of claim 1, wherein the instructions that are executed by the at least one processor are further executed to obtain the one or more criteria from a requirements document that indicates one or more performance requirements of the physical resource associated with the second sub-object instance.

3. The system of claim 1, wherein the instructions that are executed by the at least one processor are further executed to obtain at least one of the one or more criteria from at least one of a physical build guide or a logical build guide of the physical resource associated with the second sub-object instance.

4. The system of claim 1, wherein the instructions that are executed by the at least one processor are further executed to identify at least one of the one or more criteria from dependency information included in the second sub-object instance.

5. The system of claim 1, wherein the instructions that are executed by the at least one processor are further executed to generate a test plan including the respective test procedures formatted in a human readable form.

6. The system of claim 1, wherein the instructions that are executed by the at least one processor are further executed to control operation of the integrated computing system for performing each of the respective test procedures in the integrated computing system.

7. The system of claim 6, wherein the instructions that are executed by the at least one processor are further executed to control operation of the one or more external devices for creating a test environment under which at least one of the respective test procedures is performed.

8. The system of claim 1, wherein the instructions that are executed by the at least one processor are further executed to perform a discovery operation to obtain configuration information about the physical resources in the integrated computing system, and create the first object instance using the discovered configuration information.

9. The system of claim 1, wherein the instructions that are executed by the at least one processor are further executed to obtain the first object instance from an integrated computing system design tool, wherein the integrated computing system has not been deployed.

10. A method for use as part of a test management system for an integrated computing system, the method comprising:
obtaining, using executable instructions stored in a non-transitory storage medium and executed on at least one processor, a first object instance of the integrated computing system, the first object instance generated by applying configuration attributes of the integrated computing system to an object model of the integrated computing system, the first object instance including a plurality of hierarchally arranged first sub-object instances comprising a plurality of hierarchally arranged logical representations of physical resources of the integrated computing system;
generating, using the instructions executed on the at least one processor, a second object instance from the first object instance, the second object instance comprising a plurality of hierarchally arranged second sub-object instances, each second sub-object instance corresponding to a respective sub-object instance of the plurality of hierarchically arranged first sub-object instances and comprising a software implementation of a physical model of a respective hierarchically arranged physical resource, wherein the software implementation of the physical model differs from the logical representation of the physical resource;
identifying, using the instructions executed on the at least one processor, one or more criteria associated with each second sub-object instance, the one or more criteria comprising interdependency information between the plurality of hierarchically arranged first sub-object instances;
generating, using the instructions executed on the at least one processor, respective test procedures to verify proper operation of the physical resources associated with the second sub-object instances according to the one or more criteria, the respective test procedures comprising instructions to be sent to one or more external devices comprising at least one power source, and inputs to the physical resources of the integrated computing;

modifying, using the instructions executed on the at least one processor, each second sub-object instance comprising the software implementation of the physical model of the respective hierarchically arranged physical resource to include one or more of the respective test procedures corresponding to the associated physical resource of the modified second sub-object instance; and operating the at least one power source according to the respective test procedures of the second sub-object instance, wherein success or failure of the respective test procedures is determined based on a response of the physical resources of the integrated computing system to the inputs.

11. The method of claim 10, further comprising obtaining at least one of the one or more criteria from a requirements document that indicates one or more performance requirements of the physical resource associated with the second sub-object instance, from at least one of a physical build guide or a logical build guide of the physical resource associated with the second sub-object instance, or from dependency information included in the second sub-object instance.

12. The method of claim 10, further comprising generating a test plan including the respective test procedures formatted in a human readable form.

13. The method of claim 10, further comprising controlling operation of the integrated computing system for performing each of the respective test procedures in the integrated computing system.

14. The method of claim 13, further comprising controlling operation of the one or more external devices for creating a test environment under which at least one of the respective test procedures is performed.

15. The method of claim 10, further comprising performing a discovery operation to obtain configuration information about the physical resources in the integrated computing system, and create the first object instance using the discovered configuration information.

16. A non-transitory, computer readable medium storing instructions that, when executed by at least one processor, is operable to perform at least the following:

obtaining a first object instance of an integrated computing system, the first object instance generated by applying configuration attributes of the integrated computing system to an object model of the integrated computing system, the first object instance including a plurality of hierarchically arranged first sub-object instances comprising a plurality of hierarchically arranged logical representations of physical resources of the integrated computing system;

generating a second object instance from the first object instance, the second object instance comprising a plurality of hierarchically arranged second sub-object instances, each second sub-object instance corresponding to a respective sub-object instance of the plurality of hierarchically arranged first sub-object instances and comprising a software implementation of a physical model of a respective hierarchically arranged physical resource, wherein the software implementation of the physical model differs from the logical representation of the physical resource;

identifying one or more criteria associated with the each second sub-object instance, the one or more criteria comprising interdependency information between the plurality of hierarchically arranged first sub-object instances;

generating respective test procedures to verify proper operation of the physical resources associated with second sub-object instances according to the one or more criteria, the respective test procedures comprising instructions to be sent to one or more external devices comprising at least one power source, and inputs to the physical resources of the integrated computing system;

modifying each second sub-object instance comprising the software implementation of the physical model of the respective hierarchically arranged physical resource to include one or more of the respective test procedures corresponding to the associated physical resource of the modified second sub-object instance; and operating the at least one power source according to the respective test procedures of the second sub-object instance, wherein success or failure of the respective test procedures is determined based on a response of the physical resources of the integrated computing system to the inputs.

17. The non-transitory, computer readable medium of claim 16, further operable to perform obtaining at least one of the one or more criteria from a requirements document that indicates one or more performance requirements of the physical resource associated with the second sub-object instance, from at least one of a physical build guide or a logical build guide of the physical resource associated with the second sub-object instance, or from dependency information included in the second sub-object instance.

18. The non-transitory, computer readable medium of claim 16, further operable to perform generating a test plan including the respective test procedures formatted in a human readable form.

19. The non-transitory, computer readable medium of claim 16, further operable to perform controlling operation of the integrated computing system for performing each of the respective test procedures in the integrated computing system.

20. The non-transitory, computer readable medium of claim 19, further operable to perform controlling operation of the one or more external devices for creating a test environment under which at least one of the respective test procedures is performed.

* * * * *